United States Patent
Arai

(10) Patent No.: US 9,688,236 B2
(45) Date of Patent: Jun. 27, 2017

(54) VEHICLE WEBBING GUIDE STRUCTURE

(71) Applicant: HONDA MOTOR CO., LTD., Tokyo (JP)

(72) Inventor: Shunsuke Arai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/742,953

(22) Filed: Jun. 18, 2015

(65) Prior Publication Data

US 2016/0001738 A1    Jan. 7, 2016

(30) Foreign Application Priority Data

Jul. 2, 2014    (JP) .................. 2014-136941

(51) Int. Cl.
*B60R 22/26*    (2006.01)
*B60R 22/02*    (2006.01)
*B60R 22/18*    (2006.01)

(52) U.S. Cl.
CPC ............ *B60R 22/26* (2013.01); *B60R 22/023* (2013.01); *B60R 2022/029* (2013.01); *B60R 2022/1818* (2013.01)

(58) Field of Classification Search
CPC . B60R 22/023; B60R 22/26; B60R 2022/029; B60R 2022/1818
See application file for complete search history.

(56) References Cited

U.S. PATENT DOCUMENTS

| | | | | | |
|---|---|---|---|---|---|
| 3,770,078 | A | * | 11/1973 | Keppel | ................... E05B 77/48 |
| | | | | | 280/803 |
| 4,056,271 | A | * | 11/1977 | Imabuchi | ................ B60R 22/04 |
| | | | | | 280/804 |
| 4,451,060 | A | * | 5/1984 | Sylven | .................... B60R 22/22 |
| | | | | | 280/801.1 |

(Continued)

FOREIGN PATENT DOCUMENTS

DE    102008045647 A1    3/2009
JP       05-319207 A    3/1993

(Continued)

OTHER PUBLICATIONS

Notification of Reasons for Refusal dated Jan. 26, 2016, issued in counterpart Japanese Patent Application No. 2014-136941, with English machine translation. (6 pages).

*Primary Examiner* — Barry Gooden, Jr.
(74) *Attorney, Agent, or Firm* — Westerman, Hattori, Daniels & Adrian, LLP

(57) ABSTRACT

A vehicle body includes a pillar member disposed on an outer side of a cabin in a vehicle width direction and a side wall member located closer to inside in the vehicle width direction than the pillar member and coupled to the pillar member. The guide member for guiding drawing of a webbing includes a front edge fixing portion coupled to the pillar member, a rear edge fixing portion coupled to the side wall member, and a guide body whose two ends are coupled to the front and rear edge fixing portions and which forms a webbing drawing opening together with the pillar member and the side wall member. The front and rear edge fixing portions are separated from each other with an interval greater than or equal to a width of the webbing and coupled to the pillar member and the side wall member.

6 Claims, 6 Drawing Sheets

(56) References Cited

U.S. PATENT DOCUMENTS

| | | | | |
|---|---|---|---|---|
| 4,645,234 A * | 2/1987 | Koide | ............... | B60R 22/022 |
| | | | | 280/808 |
| 4,730,875 A * | 3/1988 | Yoshitsugu | ............ | B60R 22/02 |
| | | | | 297/468 |
| 4,964,666 A * | 10/1990 | Dillon | ................. | B60R 21/12 |
| | | | | 296/24.46 |
| 5,080,440 A * | 1/1992 | Tagawa | ............... | B60R 22/26 |
| | | | | 280/807 |
| 7,131,669 B2 * | 11/2006 | Morita | ............... | B60R 22/24 |
| | | | | 280/808 |
| 2001/0002087 A1 * | 5/2001 | Townsend | ........... | A42B 3/0473 |
| | | | | 280/801.1 |
| 2004/0124690 A1 * | 7/2004 | Morita | ............... | B60R 22/24 |
| | | | | 297/463.1 |
| 2005/0127659 A1 * | 6/2005 | Hearn | ............... | B60R 22/023 |
| | | | | 280/801.1 |
| 2008/0030013 A1 * | 2/2008 | Burghardt | ............ | B60R 22/26 |
| | | | | 280/808 |
| 2012/0139222 A1 * | 6/2012 | Lee | ..................... | B60R 22/22 |
| | | | | 280/801.2 |
| 2014/0368015 A1 * | 12/2014 | Basters | ............. | B60N 2/688 |
| | | | | 297/354.11 |
| 2015/0084323 A1 * | 3/2015 | Han | ..................... | B60R 22/14 |
| | | | | 280/807 |
| 2015/0343931 A1 * | 12/2015 | Koike | ................ | B60N 2/688 |
| | | | | 297/468 |

FOREIGN PATENT DOCUMENTS

| | | |
|---|---|---|
| JP | 8-216828 A | 8/1996 |
| JP | 2010-179705 A | 8/2010 |

* cited by examiner

VEHICLE WEBBING GUIDE STRUCTURE

CROSS REFERENCES TO RELATED APPLICATIONS

The present application claims priority under 35 U.S.C. §119 to Japanese Patent Application No. 2014-136941, filed Jul. 2, 2014, entitled "Vehicle Webbing Guide Structure." The contents of this application are incorporated herein by reference in their entirety.

BACKGROUND

1. Field

The present disclosure relates to a vehicle webbing guide structure for guiding a webbing of a seatbelt unit.

2. Description of the Related Art

In a known seatbelt unit of a vehicle, a retractor around which a webbing is wound is disposed below a pillar member on a side of a vehicle body, and the webbing is drawn upward from the retractor to a location below a front part of the seat by way of a guide member disposed above the pillar member (see, for example, Japanese Unexamined Patent Application Publication No. 8-216828).

In a webbing guide structure described in Japanese Unexamined Patent Application Publication No. 8-216828, a reinforcing member for supporting the guide member is made of a combination of a plurality of panel members on top of the pillar member, and the guide member is fixed by being bolted to the reinforcing members. The guide member has a long webbing insertion hole and is slidably attached to the reinforcing member of the pillar member.

SUMMARY

In the known webbing guide structure, the guide member having the webbing insertion hole is bolted and fixed to an upper portion of the pillar member with a single bolt (an insertion member). Thus, when a large load in a drawing direction is applied from a passenger to the webbing during the use of the seatbelt unit, this load is transferred to the upper portion of the pillar member through the guide member and the single bolt. In the known webbing guide structure, since the reinforcing member is composed of the combination of the multiple panel members, the upper portion of the pillar member can receive the applied load with sufficient rigidity.

In the known webbing guide structure, however, since the load applied from the webbing is received with the sufficient rigidity, the pillar member needs to be reinforced by the multiple panel members. The increase in the number of components might increase the weight and manufacturing cost.

The present application describes a vehicle webbing guide structure that enables a vehicle body to support a load applied from a webbing with high rigidity with a reduced increase in the number of components.

A vehicle webbing guide structure according to a first aspect of an embodiment of the present disclosure guides a webbing (e.g., a webbing 16 of the embodiment) of a seatbelt unit drawn upward from a webbing retractor (e.g., a retractor 15 of the embodiment) by changing the direction of the webbing by means of a guide member (e.g., a guide member 20 of the embodiment) attached to a vehicle body. In this vehicle webbing guide structure, the vehicle body includes a pillar member (e.g., a pillar member 10 of the embodiment) disposed on an outer side of a cabin in a vehicle width direction and a side wall member (e.g., a holding block 19, a wheelhouse gusset 12, and a rear wheelhouse 11 of the embodiment) located closer an inner side of the cabin in the vehicle width direction than the pillar member and coupled to the pillar member, the guide member includes a front edge fixing portion (e.g., a front edge fixing portion 22 of the embodiment) coupled to the pillar member, a rear edge fixing portion (e.g., a rear edge fixing portion 23 of the embodiment) coupled to the side wall member, and a guide body (e.g., a guide body 24 of the embodiment) whose two ends (a front end and a rear end) are coupled to the front edge fixing portion and the rear edge fixing portion and which forms a webbing drawing opening (e.g., a drawing opening 21 of the embodiment) together with the pillar member and the side wall member, and the locations of the front edge fixing portion and the rear edge fixing portion are separated, i.e., distanced from each other with an interval greater than or equal to a width of the webbing and coupled to the pillar member and the side wall member.

In this structure, the front edge fixing portion and the rear edge fixing portion of the guide member are fixed to the vehicle body across the pillar member and the side wall member. In this state, the webbing drawing opening is formed by the guide body of the guide member, the pillar member, and the side wall member, and the webbing drawn upward from the retractor is inserted into the webbing drawing opening. When a load in the drawing direction is applied from a passenger to the webbing during the use of the seatbelt unit, the load is dispersed to and supported by the pillar member and the side wall member of the vehicle body through the front edge fixing portion and the rear edge fixing portion of the guide member. In particular, since the front edge fixing portion and the rear edge fixing portion are separated from each other with an interval greater than or equal to the width of the webbing and coupled to the pillar member and the side wall member, the load in the drawing direction applied to the webbing is dispersed to and supported in a wider range on the vehicle body. Thus, the load applied from the webbing is supported by the vehicle body with high rigidity. The pillar member and the side wall member of the vehicle body and the guide member attached to the vehicle body across the pillar member and the side wall member form a closed cross-section with a webbing drawing opening sandwiched among them. This closed cross-section can enhance the rigidity of the vehicle body.

According to a second aspect of the embodiment, in the vehicle webbing guide structure of the first aspect, the guide body includes a webbing-sliding guide portion (e.g., a webbing-sliding guide portion 25 of the embodiment) that substantially linearly extends and guides the webbing such that the webbing is slidable, and a bent portion (e.g., a second bent portion 27 of the embodiment) that bends and is continuous with an end in a direction in which the webbing-sliding guide portion extends, and the guide member includes a projecting region (e.g., a forward projecting region 32 of the embodiment) that projects relative to a line connecting a fixing point (e.g., a fixing point F1 of the embodiment) of the rear edge fixing portion to the side wall member and a fixing point (e.g., a fixing point F2 of the embodiment) of the front edge fixing portion relative to the pillar member.

In this case, since the guide member includes the projecting region, when a load is applied to the projecting region from above, torsion easily occurs about the line connecting the fixing point of the front edge fixing portion and the fixing point of the rear edge fixing portion. Thus, the guide member can be supported with high rigidity with application of a load in the front-rear direction or the vehicle width direction. When a load is applied from above, the guide member can flexibly receive the load by utilizing torsion deformation thereof. As described above, the webbing-sliding guide portion substantially linearly extends. The term "substantially" for this purpose is intended to mean that the linearly-extending portion does not have to exactly be linear in its entire length as long as any non-linear surfaces do not affect its function to stably support a belt-shaped webbing having certain width along the linearly-extending portion.

According to a third aspect of the embodiment, in the vehicle webbing guide structure of the second aspect, the guide member is substantially symmetric with respect to a lateral line as a whole in a state where the guide member is attached to the vehicle body. In other words, a pair of the vehicle webbing guide members having the mirror image can be provided.

In this case, in a situation where horizontally symmetric attachment parts are provided on both sides in the width direction of the vehicle body, the guide member having an identical shape can be used by rotating the guide member by a half turn at each of the left and right in the vehicle width direction so that the guide members of the same type can be used on the left and right of the vehicle body. Thus, a large number of components with different specifications do not need to be manufactured, thereby reducing the manufacturing cost. As described above, the guide member is substantially symmetric. The term "substantially" for this purpose is intended to mean that the symmetric shape does not have to exactly be symmetric to such an extent that the guide members of the same type can still be used on the left and right of the vehicle body.

According to a fourth aspect of the embodiment, in the vehicle webbing guide structure of the second aspect, a bend angle (e.g., a bend angle a1 of the embodiment) of a base of the front edge fixing portion with respect to the webbing-sliding guide portion differs from a bend angle (e.g., a bend angle a2 of the embodiment) of a base of the rear edge fixing portion with respect to the webbing-sliding guide portion.

In this case, in attaching the guide member, if the guide member is about to be fixed to the vehicle body with incorrect positioning of the front and rear, the angles of the front edge fixing portion and the rear edge fixing portion do not match those on the attachment surface of the vehicle body. Accordingly, this structure enables an operator who is about to attach the guide member to immediately realize that the front and rear of the guide member are reversed.

According to a fifth aspect of the embodiment, in the vehicle webbing guide structure of the second aspect, the front edge fixing portion and the rear edge fixing portion are respectively fixed to the pillar member and the side wall member by fastening members (e.g., bolts 28 and 29 of the embodiment) extending substantially along the extending direction in which the webbing-sliding guide portion extends.

In this case, during the use of the seatbelt unit, when a load is applied from the webbing to the webbing-sliding guide portion in a direction substantially orthogonal to the extending direction in which the webbing-sliding guide portion extends, this load is received by the fastening members as a shearing load that is advantageous for obtaining supporting strength.

According to a sixth aspect of the embodiment, in the vehicle webbing guide structure of the fifth aspect, the fastening member for one of the front edge fixing portion or the rear edge fixing portion has an insertion part that is an oval hole.

In this case, even in the presence of errors in manufacturing of the guide member and attachment of the side wall members to the pillar members, for example, the oval hole in the insertion part of one of the fastening members absorbs such errors, and the guide member can be easily attached to the pillar member and the side wall members.

According to the embodiment, during the use of the seatbelt unit, a load from the webbing is dispersed to and supported by the pillar member and the side wall member of the vehicle body through the front edge fixing portion and the rear edge fixing portion of the guide member. Thus, the load from the webbing can be supported by the vehicle body with high rigidity. In addition, since the pillar member and the side wall member of the vehicle body and the guide member attached to the vehicle body across the pillar member and the side wall member form the closed cross-section, the rigidity of the vehicle body can be efficiently enhanced without an increase in the number of components.

DESCRIPTION OF THE PREFERRED EMBODIMENTS

Figure 1:
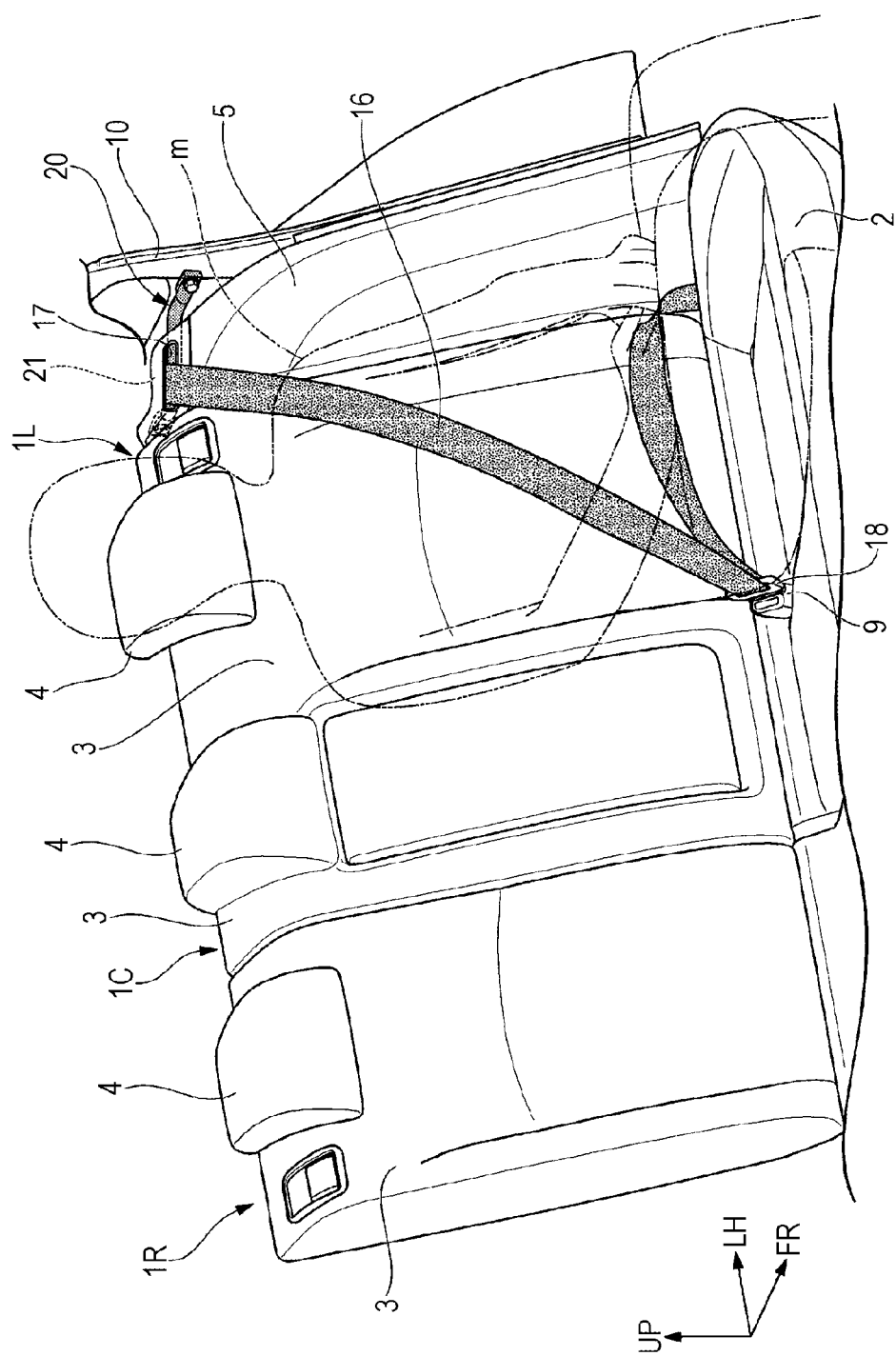
FIG. 1 is a perspective view illustrating the inside of a cabin of a vehicle according to an embodiment.

An embodiment of the present disclosure will be described with reference to the drawings. In the following description, "front," "rear," "top," "bottom," and other position-related words refer to the front, rear, top and bottom, for example, of a vehicle body, without specifically defining these words. In the drawings, arrow FR refers to the front of the vehicle, arrow UP refers to the top of the vehicle, arrow LH refers to the left of the vehicle.

FIG. 1 illustrates rear seats and the interior of a vehicle of an embodiment. As illustrated in FIG. 1, the rear seats of the vehicle include a left seat 1L, a right seat 1R, and an intermediate seat 1C sandwiched between the left seat 1L and the right seat 1R. The left seat 1L and the intermediate seat 1C are formed as one unit. The seats 1L, 1R, and 1C include a seat cushion 2 that supports buttocks of a passenger m, seat backs 3 that are coupled to a rear portion of the seat cushion 2 such that the seat backs 3 can be tilted, and headrests 4 that are attached to upper portions of the seat backs 3 and support heads and necks of passengers m. Seat side trims 5 composed of resin are provided on portions of the vehicle body adjacent to the left side of the seat back 3 of the left seat 1L and the right side of the seat back 3 of the right seat 1R. In FIG. 1, only the seat side trim 5 of the left seat 1L is shown.

Figure 2:
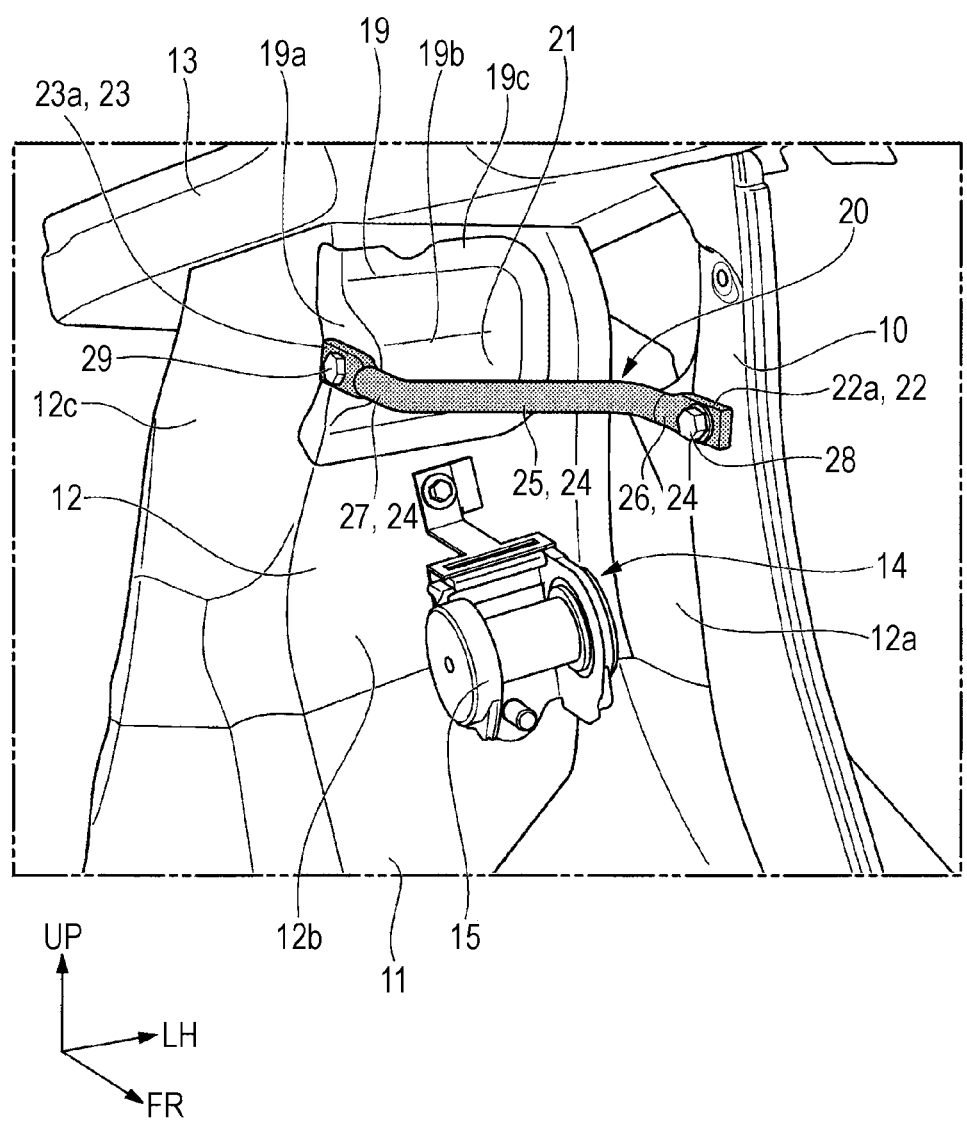
FIG. 2 is a perspective view illustrating a frame in the cabin of the vehicle of the embodiment.

FIG. 2 illustrates a left vehicle body side from which the seat side trim 5 on the side of the left seat 1L is detached. Although now shown, the right vehicle body side including a structure of a seatbelt unit 14, which will be described later, has similar structure in which the left and right are reversed as compared to the left vehicle body side. In FIG. 2, reference numeral 10 denotes a pillar member of the vehicle body on the opening edge at the rear of a rear door (not shown). The pillar member 10 extends from the floor to the roof on the vehicle width direction outer side of the left seat 1L in the cabin. A rear wheelhouse 11 that is a panel member covering an upper portion of an upper half of a rear wheel (not shown) and the inside of the cabin is attached to a lower half of the pillar member 10. A front edge of the rear wheelhouse 11 is coupled to and integrated with a wheelhouse gusset 12 that is a panel member coupling the front edge of the rear wheelhouse 11 and a frame member 13 located above the front edge.

Figure 3:
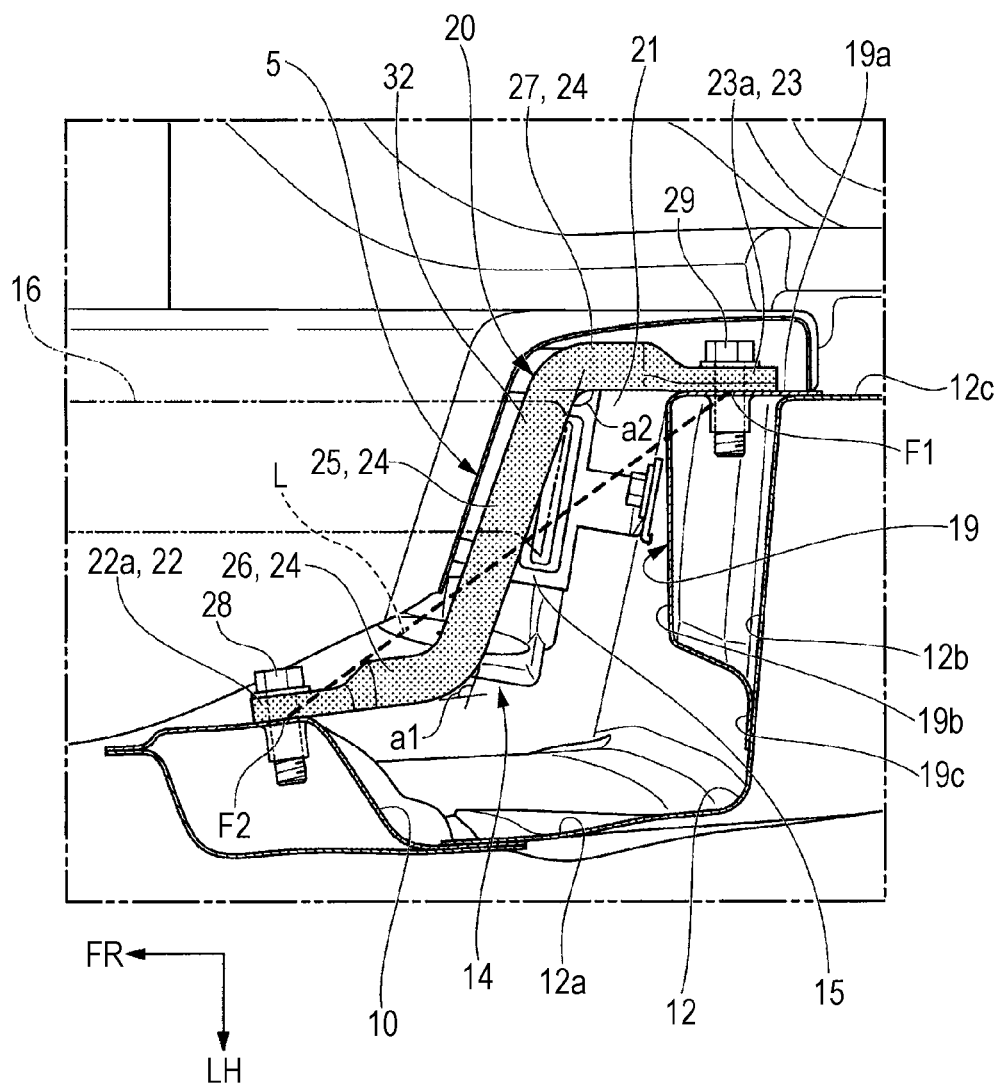
FIG. 3 is a partial cross-sectional top view illustrating a left portion of the inside of the cabin of the vehicle of the embodiment.

FIG. 3 is a partial cross-sectional top view illustrating a side portion of the left seat 1L in the cabin. As illustrated in FIGS. 2 and 3, the wheelhouse gusset 12 includes a front flange 12a joined to the rear edge of the pillar member 10, a front wall 12b bending inward in the vehicle width direction from the rear end of the front flange 12a, and an inner wall 12c bending toward the rear of the vehicle body from a vehicle width direction inner edge of the front wall 12b. The front wall 12b and the inner wall 12c project inward in the vehicle width direction relative to the pillar member 10. The seat back 3 of the left seat 1L is disposed adjacent to the inner surface in the vehicle width direction of the inner wall 12c such that the seat back 3 of the left seat 1L can be tilted.

A retractor 15 of the seatbelt unit 14 for the left seat 1L is attached to the lower edge of the front wall 12b of the wheelhouse gusset 12. In the seatbelt unit 14, a webbing 16 is wound around the retractor 15, and the webbing 16 is drawn upward from the retractor 15 and then drawn toward the front surface of the seat side trim 5 from the upper end of the wheelhouse gusset 12. As illustrated in FIG. 1, an opening 17 through which the webbing 16 is drawn forward is formed in the upper end of the seat side trim 5. The distal end of the webbing 16 drawn through the opening 17 is coupled to a seatbelt anchor on the vehicle body floor (not shown) by way of the left side of the seat cushion 2 of the left seat 1L. A tongue plate 18 is inserted into the webbing 16 drawn through the opening 17. A buckle 9 whose proximal end is fixed to the vehicle body floor (not shown) is drawn from the right side of the seat cushion 2 of the left seat 1L. The tongue plate 18 near the webbing 16 is detachable from the buckle 9.

The webbing 16 in an initial state is wound around the retractor 15, and restrains mainly the chest and abdomen of a passenger m to the left seat 1L by fixing the tongue plate 18 to the buckle 9. The retractor 15 incorporates a winding spring (not shown) that biases the webbing 16 in the winding direction and an emergency lock mechanism (not shown) that locks drawing of the webbing 16 when the webbing 16 is quickly drawn or an impact is applied to the vehicle.

A holding block 19 of a metal plate member is attached to a portion of the wheelhouse gusset 12 above the location to which the retractor 15 is attached. A flared proximal end of the holding block 19 is joined to the inner wall 12c of the wheelhouse gusset 12. The holding block 19 includes a supporting wall 19a projecting forward from the inner wall 12c and forming a segment that is a substantially circular and a protruding wall 19b protruding forward from the front wall 12b of the wheelhouse gusset 12 to form an arch. A vehicle width direction inner end of the protruding wall 19b bends at a substantially right angle and connected to the supporting wall 19a. A joint flange 19c extends along the circumference of the holding block 19 except for a joining portion at which the joint flange 19c is joined to the inner wall 12c of the protruding wall 19b. The joint flange 19c is joined to the front wall 12b of the wheelhouse gusset 12. Thus, the holding block 19 forms a substantially semicircular cylindrical closed space along the vehicle width direction between the holding block 19 and the front wall 12b of the wheelhouse gusset 12. The supporting wall 19a is coupled to the vehicle width direction inner end thereof. In this embodiment, the holding block 19, the rear wheelhouse 11, and the wheelhouse gusset 12 form a side wall member of the vehicle body.

A guide member 20 for guiding the webbing 16 drawn upward from the retractor 15 is attached to the holding block 19 (a side wall member) and the pillar member 10. The guide member 20 changes the direction of the webbing 16 drawn upward from the retractor 15 to the forward direction, and guides the direction in which the webbing 16 is drawn toward the opening 17 of the seat side trim 5. The guide member 20 is also provided on the right vehicle body side.

Figure 4:
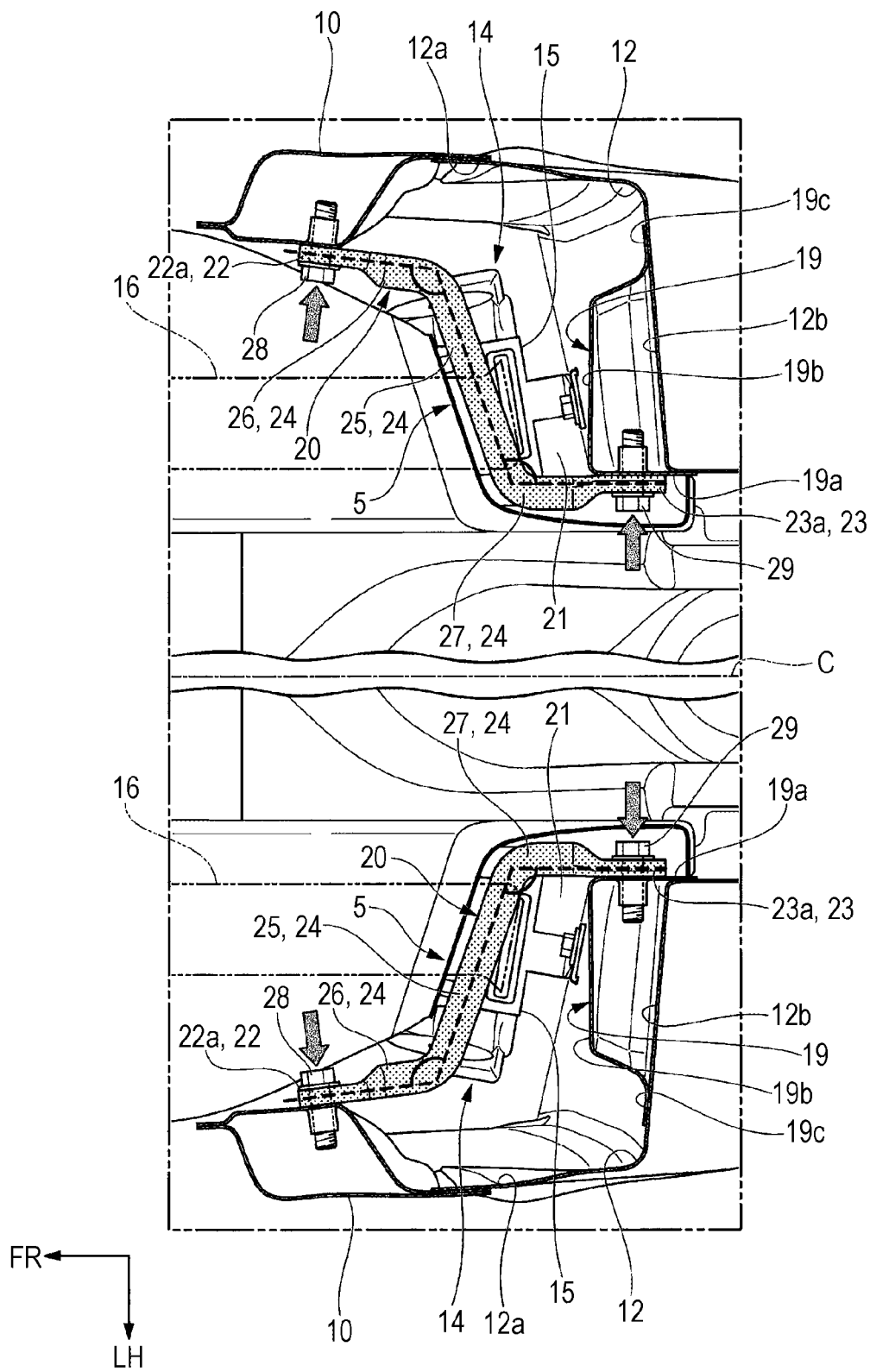
FIG. 4 is a partial cross-sectional top view illustrating the inside of the cabin of the vehicle of the embodiment.
Figure 5:
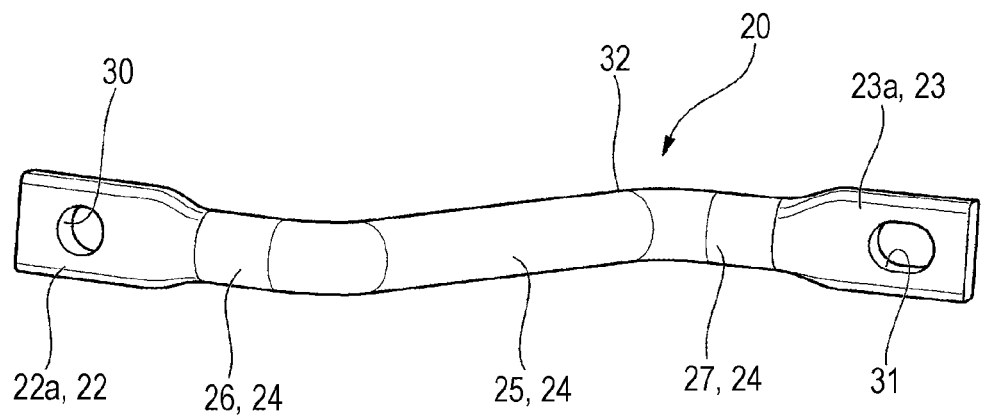
FIG. 5 is a perspective view illustrating a guide member of the embodiment.
Figure 6:
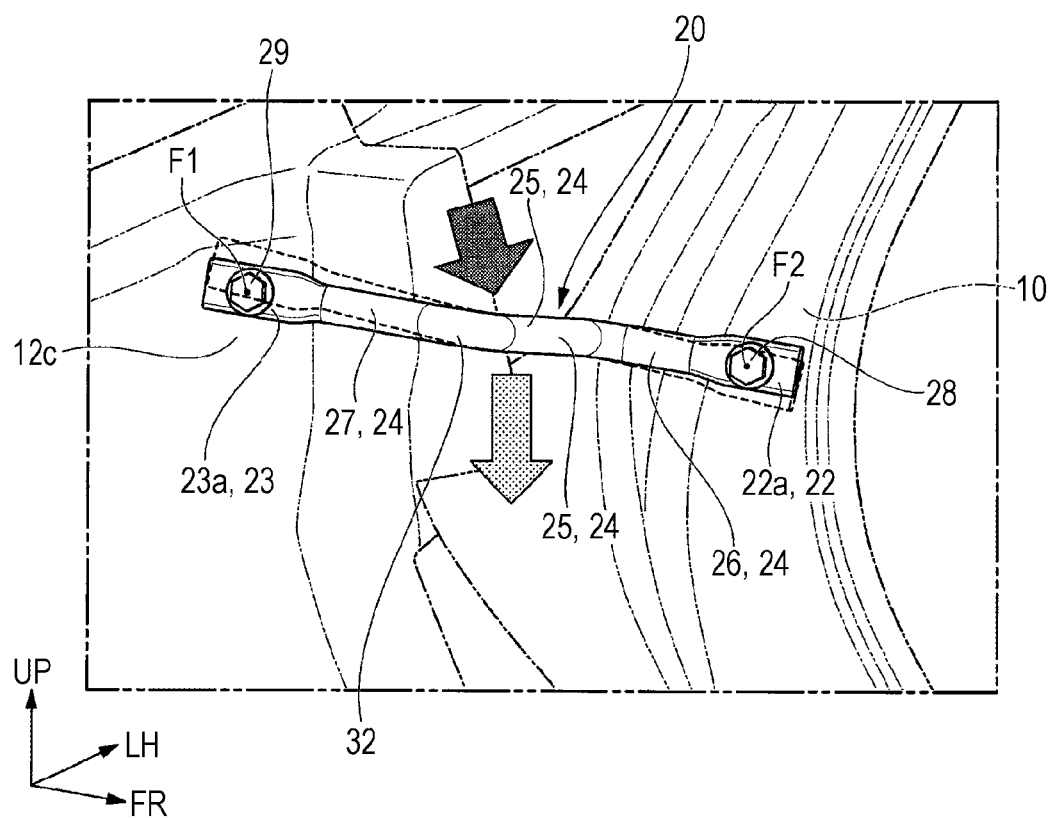
FIG. 6 is a front view illustrating the guide member of the embodiment.

FIG. 4 is a partial cross-sectional top view illustrating side portions of the left seat 1L and the right seat 1R in the cabin. In FIG. 4, a center region in the vehicle width direction is partially broken. Character C in FIG. 4 refers to the center line along the width direction of the vehicle. FIG. 5 is a perspective view of the guide member 20. FIG. 6 is a front view in an approximately horizontal direction in which the guide member 20 is attached to the vehicle body. The guide member 20 is made of a metal rod member, and includes a front edge fixing portion 22 joined to a cabin side wall of the pillar member 10, a rear edge fixing portion 23 joined to the supporting wall 19a of the holding block 19 that is a side wall member of the vehicle body, and a guide body 24 whose ends on both sides are joined to the front edge fixing portion 22 and the rear edge fixing portion 23 and which form a drawing opening 21 (a webbing drawing opening) together with the pillar member 10, the wheelhouse gusset 12, and the holding block 19.

The guide body 24 includes a cylindrical webbing-sliding guide portion 25 that extends substantially linearly and slidably guides the webbing 16 along the outer peripheral surface, a first bent portion 26 that bends from an end of the webbing-sliding guide portion 25 toward the front of the vehicle body, and a second bent portion 27 (a bent portion) that bends from the other end of the webbing-sliding guide portion 25 toward the rear of the vehicle body. In the guide member 20, the first bent portion 26 and the second bent portion 27 are formed by bending two separate portions of a linear metal wire in opposite directions. End portions in the extending directions in which the first bent portion 26 and the second bent portion 27 extend are radially crushed. These crushed end portions are used as the front edge fixing portion 22 and the rear edge fixing portion 23.

The front edge fixing portion 22 and the rear edge fixing portion 23 are crushed in a direction approximately along the direction (the axial direction) in which the webbing-sliding guide portion 25 extends. The flat portions of the front edge fixing portion 22 and the rear edge fixing portion 23 formed by the crushing are bases 22a and 23a that are overlaid on the cabin inner side surface of the pillar member 10 and the cabin inner side surface of the supporting wall 19a of the holding block 19 as illustrated in FIG. 3. The bases 22a and 23a of the front edge fixing portion 22 and the rear edge fixing portion 23 are fastened and fixed to the pillar member 10 and the holding block 19 with bolts 28 and 29, which are fastening members. The bases 22a and 23a of the front edge fixing portion 22 and the rear edge fixing portion 23 have insertion holes 30 and 31 (insertion parts) into which the bolts 28 and 29 are inserted. The insertion hole 30 of the front edge fixing portion 22 is circular, and the insertion hole 31 of the rear edge fixing portion 23 is oval. The front edge fixing portion 22 and the rear edge fixing portion 23 are separated from each other with an interval greater than or equal to the width of the webbing 16 and fastened and fixed to the pillar member 10 and the holding block 19.

The guide member 20 is fixed to the vehicle body by fastening with the bolts 28 and 29 of the front edge fixing portion 22 and the rear edge fixing portion 23 such that the entire guide member 20 is substantially horizontally oriented in a side view. In a configuration in which the guide member 20 is attached to the vehicle body as described above, the front edge fixing portion 22 and the first bent portion 26 continuous with the front edge fixing portion 22 linearly extend toward the rear of the vehicle body, and the rear edge fixing portion 23 and the second bent portion 27 continuous with the rear edge fixing portion 23 linearly extend toward the front of the vehicle body. The webbing-sliding guide portion 25 of the guide member 20 linearly extends substantially along the vehicle width direction while being slightly tilted toward the rear of the vehicle body from the first bent portion 26 to the second bent portion 27. The bolts 28 and 29 that fix the front edge fixing portion 22 and the rear edge fixing portion 23 of the guide member 20 to the vehicle body extend substantially along the vehicle width direction, that is, substantially along the direction in which the webbing-sliding guide portion 25 extends. In this state, bolts 28 and 29 are fastened to the vehicle body.

As illustrated in FIG. 3, in the state where the guide member 20 is attached to the vehicle body, the guide member 20 includes a forward projecting region 32 (a projecting region) that projects forward in the vehicle body relative to a line L connecting a fixing point F1 of the bolt 29 to the holding block 19 of the rear edge fixing portion 23 and a fixing point F2 of the bolt 28 to the pillar member 10 of the front edge fixing portion 22. The guide member 20 is oriented at an angle different from a bend angle a1 of the base 22a of the front edge fixing portion 22 with respect to the axis of the webbing-sliding guide portion 25 and a bend angle a2 of the base 23a of the rear edge fixing portion 23 with respect to the axis of the webbing-sliding guide portion 25. The guide member 20 is substantially symmetric with respect to a lateral line as a whole in a state where the guide member 20 is attached to the vehicle body.

In the webbing guide structure of this embodiment, the webbing 16 drawn upward from the retractor 15 is drawn toward the front of the sheets 1L and 1R through the drawing opening 21 at the rear of the guide member 20 and the opening 17 of the seat side trim 5. While the passenger m wears the seatbelt unit 14, when the webbing 16 is strongly jerked forward by the upper body of the passenger m so that the lock mechanism of the retractor 15 operates, the jerking load of the webbing 16 acts on the guide body 24 of the guide member 20.

At this time, the load applied from the webbing 16 to the guide body 24 of the guide member 20 is dispersed to and supported by the pillar member 10 on the side of the vehicle body and the holding block 19, the wheelhouse gusset 12, and the rear wheelhouse 11, for example, located on the inner sides in the vehicle width direction of the pillar member 10 through the front edge fixing portion 22 and the rear edge fixing portion 23. In particular, in the guide member 20 of this embodiment, the front edge fixing portion 22 and the rear edge fixing portion 23 are separated from each other with an interval greater than or equal to the width of the webbing 16 and coupled to the pillar member 10 and the holding block 19. Thus, the load in the drawing direction of the webbing 16 is dispersed and supported in a wide range on the vehicle body. Accordingly, in the webbing guide structure of this embodiment, the load applied from the webbing 16 can be supported by the vehicle body with high rigidity without a significant increase in the number of components due to the presence of additional reinforcing members in the vehicle body.

In the webbing guide structure of this embodiment, the front edge fixing portion 22 and the rear edge fixing portion 23 of the guide member 20 are coupled to the pillar member 10 on the side of the vehicle body and the holding block 19 that is the vehicle body side wall member closer to the center in the vehicle width direction than the pillar member 10. In addition, the guide member 20, the pillar member 10, and the holding block 19, for example, form a closed cross section (the drawing opening 21) substantially in a horizontal direction. Thus, the guide member 20 that guides the webbing 16 can efficiently enhance the rigidity in the vehicle width direction and the front-rear direction of the side portions of the vehicle body.

Furthermore, in the webbing guide structure of this embodiment, the guide member 20 is attached to the vehicle body such that the guide body 24 is substantially horizontally oriented. In addition, the guide body 24 includes the forward projecting region 32 that projects forward in the vehicle body relative to the line L connecting the fixing point F1 of the rear edge fixing portion 23 to the vehicle body and the fixing point F2 of the front edge fixing portion 22 to the vehicle body. Thus, in the guide member 20, when the load is applied in the vehicle width direction or the front-rear direction, this load can be supported with high rigidity. On the other hand, when a large load is applied to the forward projecting region 32 from above, torsion deformation easily occurs about the line L connecting the fixing points F1 and F2 as indicated by the arrows in FIG. 6. Accordingly, in this webbing guide structure, when the passenger load acts on the forward projecting region 32 of the guide member 20 from above, torsion deformation of the guide member 20 enables the passenger load to be flexibly received.

In the webbing guide structure of this embodiment, the guide member 20 is substantially symmetric with respect to a lateral line as a whole in a state where the guide member 20 is attached to the vehicle body. Thus, as illustrated in FIG. 4, in a case where the attachment portion of the vehicle body is symmetric with respect to a top-bottom line, the common guide member 20 can be used by rotating the guide member 20 by a half turn at each of the left and right in the vehicle width direction. This configuration eliminates the necessity for separately preparing dedicated components for the left and right sides of the vehicle body, resulting in reduction of the cost of products.

Figure 7:
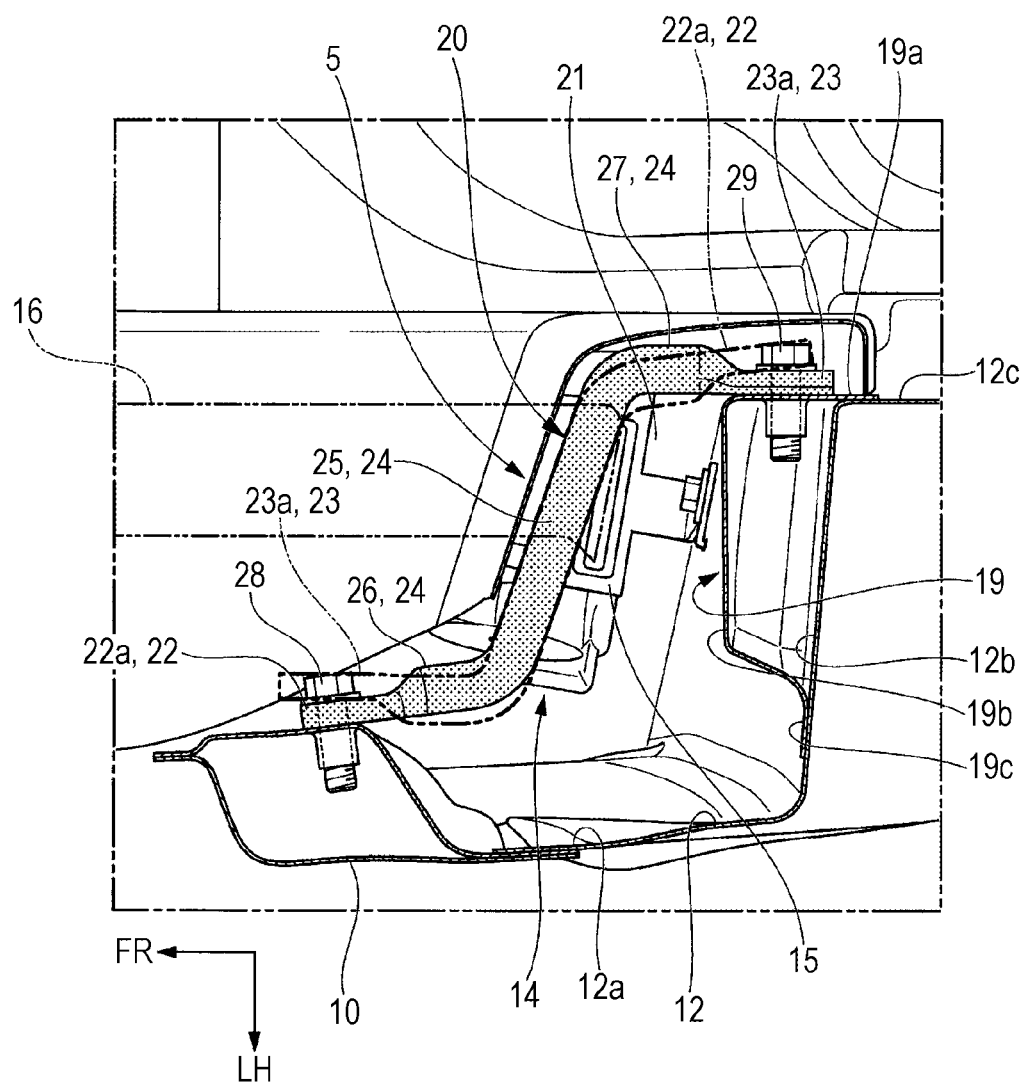
FIG. 7 is a partial cross-sectional top view illustrating the frame in the cabin of the vehicle of the embodiment.

In the webbing guide structure of this embodiment, the bend angle a1 of the base 22a of the front edge fixing portion 22 differs from the bend angle a2 of the base 23a of the rear edge fixing portion 23 in the guide member 20. Thus, when attaching the guide member 20 to the vehicle body, if the guide member 20 is about to be fixed to the vehicle body by incorrect positioning of the front and rear as indicated by the vertical lines in FIG. 7, the angles of the bases 22a and 23a of the front edge fixing portion 22 and the rear edge fixing portion 23 do not match those on the attachment surface of the vehicle body. Accordingly, this structure enables an operator who is about to attach the guide member 20 to the vehicle body to immediately realize that the front and rear of the guide member 20 are reversed.

In the webbing guide structure of this embodiment, the front edge fixing portion 22 and the rear edge fixing portion 23 of the guide member 20 are fastened to the pillar member 10 and the holding block 19 with the bolts 28 and 29 substantially along the direction in which the webbing-sliding guide portion 25 of the guide member 20 extends. Thus, during the use of the seatbelt unit 14, when a load is applied from the webbing 16 to the webbing-sliding guide portion 25 of the guide member 20 in a direction substantially orthogonal to the direction in which the webbing-sliding guide portion 25 extends, this load is received by the bolts 28 and 29 as a shearing load that is advantageous for obtaining supporting strength. As a result, the structure described above can efficiently enhance the supporting rigidity and strength of the guide member 20.

In the webbing guide structure of this embodiment, the insertion hole 31 formed in the rear edge fixing portion 23 of the guide member 20 is oval. Thus, even in the presence of errors in manufacturing of the guide member 20 and attachment of the side wall members of the vehicle body, for example, the oval hole absorbs such errors, and the guide member 20 can be easily attached to the pillar member 10 and the side wall members of the vehicle body. In this embodiment, the insertion hole 31 of the rear edge fixing portion 23 of the guide member 20 is oval. Alternatively, the insertion hole 30 of the front edge fixing portion 22 may be oval.

The present application is not limited to the foregoing embodiment, and various design changes can be made within the scope of the present disclosure.

What is claimed is:

1. A vehicle webbing guide structure attached to a vehicle body, comprising:
   a pillar member of the vehicle body disposed on an outer side of a cabin in a vehicle width direction;
   a side wall member coupled to the pillar member and located closer to an inner side of the cabin in the vehicle width direction than the pillar member; and
   a guide member supported by the pillar member and the side wall member and configured to guide a webbing of a seatbelt unit, the guide member comprising:
      a front edge fixing portion coupled to the pillar member,
      a rear edge fixing portion coupled to the side wall member, and
      a guide body having a front end and a rear end respectively coupled to the front edge fixing portion and the rear edge fixing portion and extending between the front end and the rear end such that the guide body, together with the pillar member and the side wall member, forms an opening through which the webbing drawn upward from a webbing retractor is guided downward by the guide body,
   wherein the front edge fixing portion and the rear edge fixing portion are located away from each other by a distance greater than or equal to a width of the webbing, and
   wherein the guide body comprises,
      a webbing guide portion that substantially linearly extends and guides the webbing by slidably supporting the webbing, and
      a bent portion that extends from the webbing guide portion while bending toward one of the front and rear edge fixing portions of the guide body, such that the guide member at least in part projects relative to a line connecting the front end and the rear end, and such that the webbing guide portion crosses the line connecting the front edge fixing portion and the rear edge fixing portion.

2. The vehicle webbing guide structure of claim 1, wherein
   the guide member is shaped substantially symmetrically in its entirety with respect to a lateral line perpendicular to the vehicle width direction in a state where the guide member is attached to the vehicle body.

3. The vehicle webbing guide structure of claim 1, wherein
   the guide body comprises,
   a webbing guide portion that substantially linearly extends and guides the webbing by slidably supporting the webbing,
   a first bent portion that extends from the webbing guide portion while bending toward the front end of the guide body such that the guide member at least in part projects relative to a line connecting the front end and the rear end, and
   a second bent portion that extends from the webbing guide portion while bending toward the rear end of the guide body such that the guide member at least in part projects relative to the line connecting the front end and the rear end, and
   a first bend angle of the first bent portion with respect to the webbing guide portion differs from a second bend angle of the second bent portion with respect to the webbing guide portion.

4. The vehicle webbing guide structure of claim 1, wherein
   the guide body extends in a horizontal direction.

5. The vehicle webbing guide structure of claim 1, further comprising fastening members that fix the front edge fixing portion and the rear edge fixing portion to the pillar member and the side wall member, relatively, wherein
   the fastening members extend substantially along a direction in which the webbing guide portion extends.

6. The vehicle webbing guide structure of claim 5, wherein
   one of the front or rear edge fixing portions has an oval hole into which one of the fastening members is inserted for said fixing.

* * * * *